(12) United States Patent
Wienken

(10) Patent No.: US 6,732,851 B2
(45) Date of Patent: May 11, 2004

(54) APPARATUS FOR DELIVERY OF IMPACT-SENSITIVE ARTICLES

(75) Inventor: August Wienken, Bakum (DE)

(73) Assignee: Big Dutchman International, GmbH (DE)

( * ) Notice: Subject to any disclaimer, the term of this patent is extended or adjusted under 35 U.S.C. 154(b) by 31 days.

(21) Appl. No.: 10/278,533

(22) Filed: Oct. 23, 2002

(65) Prior Publication Data

US 2003/0077160 A1 Apr. 24, 2003

(30) Foreign Application Priority Data

Oct. 24, 2001 (DE) ......................... 101 52 362

(51) Int. Cl.⁷ ............................................. B65G 47/26
(52) U.S. Cl. ................. 198/459.6; 198/463.4; 198/608; 414/609
(58) Field of Search ............. 198/459.5, 459.6, 198/450, 451, 463.5, 463.4, 608; 414/609

(56) References Cited

U.S. PATENT DOCUMENTS

| | | | |
|---|---|---|---|
| 3,626,905 A | * 12/1971 | Giesbert et al. | 119/337 |
| 3,770,107 A | * 11/1973 | Michelbach | 198/633 |
| 3,789,802 A | *  2/1974 | Conley | 119/337 |
| 3,874,494 A | *  4/1975 | Temming | 198/446 |
| 4,159,696 A | *  7/1979 | Martin | 119/337 |
| 4,199,051 A | *  4/1980 | Kimberley | 198/448 |
| 4,293,066 A | * 10/1981 | Kennedy et al. | 198/813 |
| 4,489,822 A | * 12/1984 | Hiebert | 198/476.1 |
| 4,730,440 A | *  3/1988 | van der Schoot et al. | 53/446 |
| 4,823,737 A | *  4/1989 | Nakajima et al. | 119/440 |
| 5,002,016 A | *  3/1991 | de Vrieze | 119/337 |
| 5,176,243 A | *  1/1993 | Temming et al. | 198/400 |

FOREIGN PATENT DOCUMENTS

| | | |
|---|---|---|
| DE | 1277129 | 4/1969 |
| DE | 2221519 | 2/1973 |
| DE | 3138748 | 11/1991 |
| DE | 68907693 | 1/1994 |
| DE | 19906916 | 8/2000 |
| EP | 0368414 | 7/1993 |

* cited by examiner

Primary Examiner—Khoi H. Tran
(74) Attorney, Agent, or Firm—Price, Heneveld, Cooper, DeWitt & Litton, LLP

(57) ABSTRACT

A device for the transfer of objects that are sensitive to impact, such as eggs, includes a horizontally-feeding collection conveyor, a vertically-feeding elevator, and at least one separation wheel located in a transition area between the horizontally feeding collection conveyor and the vertically feeding elevator. The separation wheel includes an outer edge having a recessed portion adapted to cradle an egg therein, wherein at least the recessed portion of the outer edge is elastically deformable, and is thereby adapted to cushion an impact of the egg with the recessed portion of the outer edge.

14 Claims, 1 Drawing Sheet

APPARATUS FOR DELIVERY OF IMPACT-SENSITIVE ARTICLES

BACKGROUND OF THE INVENTION

Large egg production facilities typically make use of caged hens and/or free-range hens located in large structures. Collection of the eggs from within these facilities typically involve the use of numerous collection conveyors. These conveyors are typically revolving conveyors upon which the laid eggs are transported to one particular location within the facility. The eggs are then transferred from the various tiers and rows of nests or cage lines to a single level and deposited either on to a manual collection table or onto a belt conveyor from which the eggs are then transported to centralized sorting equipment and associated packaging machines.

These facilities also typically employ the use of vertical elevators so that the eggs may be collected from numerous tiers of individual collection conveyors. The collisions between eggs must be prevented during this transference from the collection conveyor to the elevator. As a result, a separation wheel, or allocation wheel, is provided within a transition area between the conveyors and the elevator.

Each separation wheel typically consists of a rotary driven wheel body that includes an outer edge having a recessed pick-up bag or other suitable indention that contains an egg during the transfer of the egg from an associated conveyor to the elevator. The separation wheels rotate at a predetermined velocity that is closely synchronized to the feed speed of each associated collection conveyor and the speed of the elevator. The rotation of each separation wheel is adjusted such that the eggs are supplied to the elevator according to a fixed formula.

The critical timing of the operation of the system is guaranteed only if a material which maintains its shape is used for the separation wheels. Such materials, however, are inevitably rigid, thereby resulting in damage to the eggs during impact against the outer edge of the associated separation wheel. Typically, the scrap rates associated with these devices are relatively high.

Therefore, there is a need for a transference device that reduces the damage to the eggs during the collection thereof.

SUMMARY OF THE INVENTION

One aspect of the present invention is to provide a device for the transfer of objects that are sensitive to impact, such as eggs, that includes a horizontally-feeding collection conveyor, a vertically feeding elevator, and at least one separation wheel located in a transition area between the horizontally-feeding collection conveyor and the vertically feeding elevator. The separation wheel includes an outer edge having a recessed portion adapted to cradle an egg therein, wherein at least the recessed portion of the outer edge is elastically deformable, and is thereby adapted to cushion an impact of the egg with the recessed portion of the outer edge.

Another aspect of the present invention is to provide a method of transferring objects that are sensitive to impact, such as eggs, that includes collecting a plurality of eggs via a horizontally feeding conveyor, transferring the plurality of eggs from the conveyor to a separation wheel, wherein the wheel includes an outer edge having a recessed portion adapted to cradle an egg therein, cushioning an impact between the eggs and the wheel via an elastically deformable surface located within the recessed portion of the wheel, and transferring the eggs from the separation wheel to a vertically-feeding elevator.

Yet another aspect of the present invention is to provide a separation wheel for transferring objects that are sensitive to impact, such as eggs, between a horizontally-feeding collection conveyor and a vertically-feeding elevator, the separation wheel including a rigid inner portion, and an outer portion having a recessed portion adapted to cradle an egg therein, wherein at least the recessed portion of the outer edge is elastically deformable, and is thereby adapted to cushion the impact of the egg with the recessed portion of the outer edge.

The present inventive device and associated method for its use provide a durable, antiseptic, efficient to use, economical to manufacture transference device for objects that are sensitive to impact, such as eggs. The present invention and related method further are capable of a long operating life, and are particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
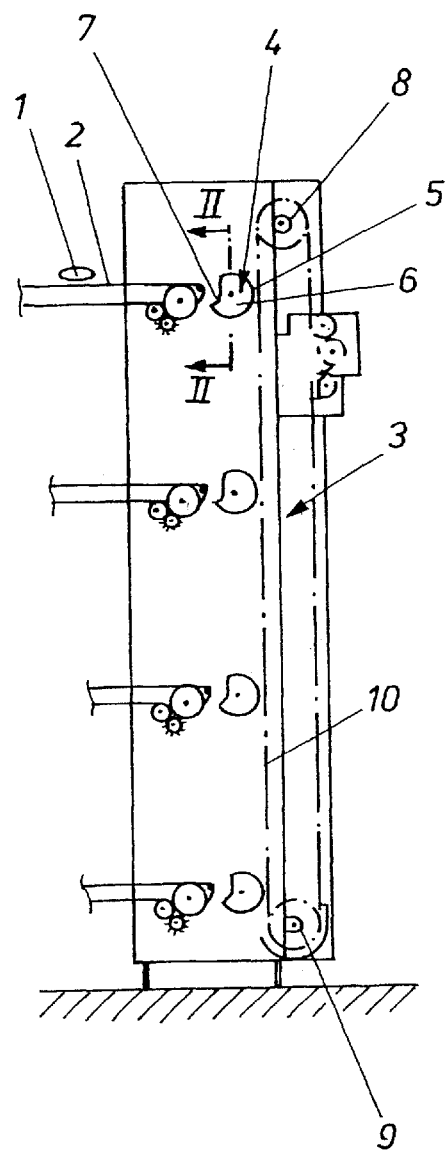
FIG. 1 is schematic view of a device for the transference of eggs via a plurality of collection conveyors arranged in several tiers and feeding horizontally to a vertically-feeding elevator.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

A transference device 1, FIG. 1, includes a horizontally-feeding collection conveyor 2, a vertically-feeding elevator 3, and at least one separation wheel 4 located in a transition area between the collection conveyor 2 and the elevator 3. The separation wheel 4 is provided with a circumferential shape that creates a type of egg pick-up bag or recessed area 7, extending into the outer edge 5 of the wheel body 6.

As is illustrated, elevator 3 is associated with a plurality of vertically-stacked collection conveyors, whereby matching separation wheels 4 are located within the transition area between the individual collection conveyors 2 in the elevator 3.

Figure 2:
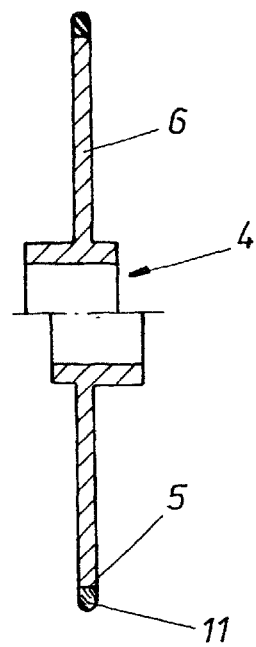
FIG. 2 is a cross-sectional view of a separation wheel, taken along the II—II, FIG. 1

In operation, the elevator 3 grasps an elevator chain 10 via upper deflection rollers 8, and lower deflection rollers 9. The elevator chain 10 is equipped with chain rods (not shown) that provide a surface for the transferred eggs as is known in the art. Each horizontally-feeding collection conveyor 2 transports the eggs 1 to the right in the direction of the elevator 3. The elevator chain 10 revolves in such a manner that the recessed areas 7 of each separation wheel 4 pass the conveyors 2. The separation wheels 4 turn in such a manner that the recessed area 7 of each separation wheel 4 periodically moves past a front edge of each of the collection conveyors 2 during which time the recessed area 7 "picks-up" an egg from the conveyor 2. As the separation wheel 4 continues to rotate in a clockwise motion, the egg 1 is transferred from the recessed area 7 onto the surface created by the rods (not shown) which are located on the downward-running portion of the elevator chain 10. As a result, the eggs 1 are first transported downward and, after passing the lower deflection roller 9, are then transported upward to a drop-off area, such as a horizontally-mounted collection table (not shown) located to the right of the elevator 3. To prevent damage to the eggs 1 as fed by the collection conveyor 2 to the elevator 3, the outer edge 5 of each of the separation wheels 4 is covered with a padding 11 consisting of a soft elastic material, such as illustrated in FIG. 2. The wheel body 6 consists of a first material component, for example a hard plastic, while the layer of padding 11 consists of a less rigid and more elastic material, such as soft plastic, cloth, rubber, etc.

The outer edge 5 of the wheel body 6 of the separation wheel 4 is constructed from a material different than that of the inner portion of the wheel body 6 with respect to rigidity and elasticity, at least in the recessed area 7. Preferably, the entire outer edge 5 is constructed of a different material than the inner portion of the wheel body 6. This construction provides a rigid and firm inner portion of the wheel body 6, thereby providing dimensional and structural stability, while simultaneously providing a cushioned outer surface 5. The separation wheel 4 may be constructed of two separate components, including a rigid inner wheel portion and a soft elastic material located upon the outer edge 5 thereof. For example, the wheel body 6 of the separation wheel 4 may include a smooth disk constructed of ABS plastic, thereby providing a smooth surface which is advantageous in that the separation wheel 4 may be easily cleaned, thereby resulting in less contamination to the collected eggs. Further, a layer of padding may be mounted to the outer edge 5 via an adhesive, or alternatively may be integrally molded with the inner portion of the wheel. In addition, each layer of the padding located on the outer edge 5 of the wheel 4 may be provided a cross-sectional profile operating similarly to a spring-like structure. For example, the layer of padding may exhibit cavities or voids, which are separated from each other by thin and pliable walls. Each layer of padding may also include elevations or recesses in the area of the empty surfaces such as, cavities, thin splines, overlaps, webs, burls, or such structural elements, which provide a shock-absorption effect during the impact of the egg with the separation wheel.

The separation wheels 4, designed according to the invention, therefore ensure that eggs are transferred to a vertically-feeding elevator gently and that the least possible lost occurs. The scrap rate of so-called nicked eggs with ruptured or cracked shells is therefore reduced.

In the foregoing description, it will be readily appreciated by those skilled in the art that modifications may be made to the invention without departing from the concept disclosed herein. Such modifications are to be considered as included in the foregoing claims, unless these claims by their language expressly state otherwise.

The invention claimed is:

1. A device for the transfer of objects that are sensitive to impact, such as eggs, comprising:
    a horizontally feeding collection conveyor;
    a vertically feeding elevator; and
    at least one separation wheel located in a transition area between the horizontally feeding collection conveyor and the vertically feeding elevator, wherein the separation wheel includes an outer edge having a recessed portion adapted to cradle an egg therein, and wherein at least the recessed portion of the outer edge is elastically deformable, and is thereby adapted to cushion an impact of the egg with the recessed portion of the outer edge.

2. The device of claim 1, wherein the wheel includes a rigid inner portion.

3. The device of claim 2, wherein the elastically deformable recessed portion of the wheel is constructed of a soft elastic material.

4. The device of claim 3, wherein the elastic material is adhered to the recessed portion of the wheel.

5. The device of claim 3, wherein the elastic material is integrally molded with the inner portion of the wheel.

6. The device of claim 3, wherein the elastic material includes a plurality of voids therein.

7. The device of claim 1, wherein the entire outer surface of the wheel is constructed of a soft elastic material.

8. A method of transferring objects that are sensitive to impact, such as eggs, comprising:
    collecting a plurality of eggs via a horizontally feeding conveyer;
    transferring the plurality of eggs from the conveyor to a separation wheel, wherein the wheel includes an outer edge having a recessed portion adapted to cradle an egg therein;
    cushioning an impact between the eggs and the wheel via an elastically deformable surface located within the recessed portion of the wheel; and
    transferring the eggs from the separation wheel to a vertically feeding elevator.

9. A separation wheel for transferring objects that are sensitive to impact, such as eggs, between a horizontally feeding collection conveyor and a vertically feeding elevator, the separation wheel comprising:
    a rigid inner portion; and
    an outer edge having a recessed portion adapted to cradle an egg therein, wherein at least the recessed portion of the outer edge is elastically deformable, and is thereby adapted to cushion the impact of the egg with the recessed portion of the outer edge.

10. The separation wheel of claim 9, wherein the elastically deformable recessed portion of the wheel is constructed of a soft elastic material.

11. The separation wheel of claim 10, wherein the elastic material is adhered to the recessed portion of the wheel.

12. The separation wheel of claim 10, wherein the elastic material is integrally molded with the inner portion of the wheel.

13. The separation wheel of claim 10, wherein the elastic material includes a plurality of voids therein.

14. The separation wheel of claim 9, wherein the entire outer surface of the wheel is constructed of a soft elastic material.

* * * * *